United States Patent
Sun

(10) Patent No.: US 8,463,137 B2
(45) Date of Patent: Jun. 11, 2013

(54) SYSTEM AND METHOD FOR TRANSMISSIONS VIA RF OVER GLASS

(75) Inventor: Chen-Kuo Sun, Escondido, CA (US)

(73) Assignee: Titan Photonics, Inc., Fremont, CA (US)

( * ) Notice: Subject to any disclaimer, the term of this patent is extended or adjusted under 35 U.S.C. 154(b) by 302 days.

(21) Appl. No.: 12/891,200

(22) Filed: Sep. 27, 2010

(65) Prior Publication Data

US 2012/0076499 A1   Mar. 29, 2012

(51) Int. Cl.
  *H04B 10/12* (2006.01)
(52) U.S. Cl.
  USPC .......................... 398/186; 398/183; 398/193
(58) Field of Classification Search
  USPC ........................................ 398/183, 186, 193
  See application file for complete search history.

(56) References Cited

U.S. PATENT DOCUMENTS

| | | | |
|---|---|---|---|
| 3,925,735 A * | 12/1975 | Ozeki et al. | 372/38.07 |
| 4,558,465 A * | 12/1985 | Siegel et al. | 398/195 |
| 5,680,104 A | 10/1997 | Slemon et al. | |
| 5,999,550 A * | 12/1999 | Bellemore et al. | 372/38.02 |
| 6,091,074 A | 7/2000 | Korevaar | |
| 6,118,131 A | 9/2000 | Korevaar | |
| 6,493,485 B1 | 12/2002 | Korevaar | |
| 6,498,668 B1 | 12/2002 | Korevaar | |
| 6,538,789 B2 | 3/2003 | Sun | |
| 6,836,585 B2 | 12/2004 | Trissel | |
| 2002/0041728 A1 * | 4/2002 | Yamashita et al. | 385/24 |
| 2002/0075919 A1 * | 6/2002 | Tochio | 372/38.02 |
| 2002/0181520 A1 * | 12/2002 | Iguchi et al. | 372/38.02 |
| 2004/0109696 A1 * | 6/2004 | Toshihisa | 398/198 |
| 2010/0272447 A1 * | 10/2010 | Kolze et al. | 398/192 |
| 2012/0027421 A1 * | 2/2012 | Chen et al. | 398/194 |
| 2012/0219286 A1 * | 8/2012 | De Langen et al. | 398/27 |

* cited by examiner

*Primary Examiner* — Nathan Curs
(74) *Attorney, Agent, or Firm* — Nydegger and Associates

(57) ABSTRACT

A system and method are provided for controlling the transmission of RF signals that are to be carried as optical signals over an optical fiber network. Operationally, the optical signals are transmitted as "bursts" in accordance with a standard protocol. For the present invention, transmission control requires an ON/OFF control that incorporates a time delay. Specifically, a "burst" of signals (RF/optical) is initiated when power in the RF input signal passes a predetermined threshold. After an established turn-on time that is set by the time delay, the ON/OFF control activates a laser diode for transmission of the "burst." Further, the present invention provides control for constant optical output power from the laser diode. Importantly, the laser diode is OFF when a "burst" is not being transmitted.

9 Claims, 1 Drawing Sheet

SYSTEM AND METHOD FOR TRANSMISSIONS VIA RF OVER GLASS

FIELD OF THE INVENTION

The present invention pertains generally to systems and methods for transmitting RF signals. More particularly, the present invention pertains to systems and methods for controlling the transmission of RF signals that are to be carried by a laser beam over a fiber-optic network (so-called "RF over Glass"). The present invention is particularly, but not exclusively, useful for achieving transmission stability in an RF system by controlling the initiation of an "RF over Glass" transmission, and by maintaining a substantially constant optical power output for the laser beam during the transmission of an RF signal.

BACKGROUND OF THE INVENTION

For a so-called "RF over Glass" network, RF signals are carried through fiber optic cables on light beams as optical signals. In order to accommodate a potentially large number of different transmitters on a same network, the optical signals are queued in accordance with a standard protocol (e.g. DOCSIS 3.0). A consequence of this queuing is that each transmitter in a network will have its own "quiet time" as other transmitters are given access to the network. However, in order to be ready for a next transmission, light sources in a transmitter for generating the carrier beam have remained partially ON during the "quiet time". This increases the transmission background noise when multiple transmitters are combined into a single fiber network.

Heretofore, the initiation of an RF transmission onto a fiber-optic network has been dependent on characteristics of the particular signal. Specifically, when there is high power in an RF signal, the turn-on time is relatively short. On the other hand, when there is low signal power, the turn-on time is extended. Thus, the turn-on time for optical transmissions can vary significantly from signal to signal, with possibly disruptive consequences. For instance, if the rise in the optical carrier power for an optical signal is too fast, dither may be introduced which can result in missing portions of the RF signal. However, if the rise in optical power is too slow, some of the RF signal may actually be lost. Neither case is acceptable.

Typical of the signal transmission protocols presently being used for "RF over Glass" networks is the use of a "burst mode" operation. As the name implies, a "burst mode" operation requires repetitive ON/OFF operations, with groups of concentrated optical signals separated by interleaved "quiet times." Unfortunately, it happens that the requirements of such operations can only aggravate the signal transmission difficulties noted above.

In light of the above, it is an object of the present invention to provide a system for controlling optical signals that will consistently stabilize "burst mode" transmissions. Another object of the present invention is to provide a system for controlling optical signals that effectively eliminates unnecessary noise on a fiber-optic network by turning the light carrier source completely OFF when there is no optical signal transmission. Still another object of the present invention is to establish a fixed, same turn-on and turn-off time for every optical transmission regardless of the RF power in a particular input signal. Yet another object of the present invention is to have a predetermined optical power level for each optical transmission. Another object of the present invention is to provide a system for controlling optical signals that is easy to use, is simple to manufacture and is comparatively cost effective.

SUMMARY OF THE INVENTION

For the present invention, a system is provided to control the transmission of RF signals onto a fiber-optic network. Specifically, these RF signals are carried over the network on a laser beam as optical signals. The optical signals are transmitted by the timed operation of a laser diode, and they are transmitted in response to the RF input signal. Importantly, the system provides for a time-delayed turn-on/turn-off of the laser diode for generation of a laser beam carrier for the RF signals. When not transmitting optical signals, the laser diode is completely turned off. Overall operation of the present invention is conducted in accordance with a standard protocol (i.e. DOCSIS 3.0) that defines "burst mode" transmissions for so-called "RF over Glass" networks.

Structurally, a transmission portion of the system of the present invention includes an RF detector and an ON/OFF control output from a threshold detection circuit. For the present invention, the RF detector can be of any type known in the pertinent art that will receive either analog or digital RF signals (e.g. voice or data transmissions). Included with the detector is a threshold level set circuit that is used to set a predetermined RF power threshold. As intended for the present invention, the ON/OFF control is responsive to the detector and will turn ON instantaneously when power in the input RF signal exceeds the predetermined threshold. On the other hand, it will turn OFF instantaneously when power in the input RF signal falls below the threshold. And both ON and OFF levels at the control output are set to fixed levels, independent of the RF input signal level. The ON/OFF output is used to enable and disable the constant optical power laser diode driver circuit, and laser diode correspondingly. As indicated above, whenever the ON/OFF control is OFF, the laser diode driver is disabled, and the laser diode will be completely turned OFF.

As implied above, it is an important aspect of the present invention that a time delay be incorporated into the optical power drive that is used to drive the laser diode. Specifically, this time delay interconnects the constant optical power laser driver with the laser diode, via a transistor interface driver circuit. In its operation, the time delay establishes a turn-on time for the laser diode that is set as a fixed time interval after the ON/OFF control turns ON. Typically, this time interval will be in a range of approximately 0.5-1.5 microseconds. Likewise, the time delay establishes a turn-off time for the laser diode that is set as a fixed time interval after the ON/OFF control turns OFF, and this time delay is typically in the range of approximately 0.5-1.5 microseconds.

Another aspect of the present invention involves control of the optical power output in the laser beam carrier. This laser beam carrier is generated by the laser diode, and it must be maintained at an appropriate operational level for proper transmission of the optical signals. To maintain this operational level, a closed-loop control is used that includes a voltage source which provides a reference voltage. Also included is a photo diode that is positioned to monitor the optical output power in the laser beam carrier when it is created by the laser diode. A power control circuit is then used to compare the optical output power detected in the monitor photo diode with the reference voltage to generate an error signal. Finally, the power control circuit adjusts the constant optical power laser diode driver output in a manner that minimizes the error signal to maintain the optical output power in the laser beam carrier substantially constant. The response time of this closed control loop is set by the time-delay disclosed in the previous section.

An additional feature of the present invention is a noise filter for removing out of band noise from the input RF signal to turn ON the laser diode. Also, the system for the present invention provides for repetition and stability in its transmission. In particular, when transmissions of the RF signal from the laser diode are made as a sequence of "burst mode" transmissions in accordance with a standard protocol, the turn-on/turn-off time for each transmission will be the same, independent of the input RF signal strength.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
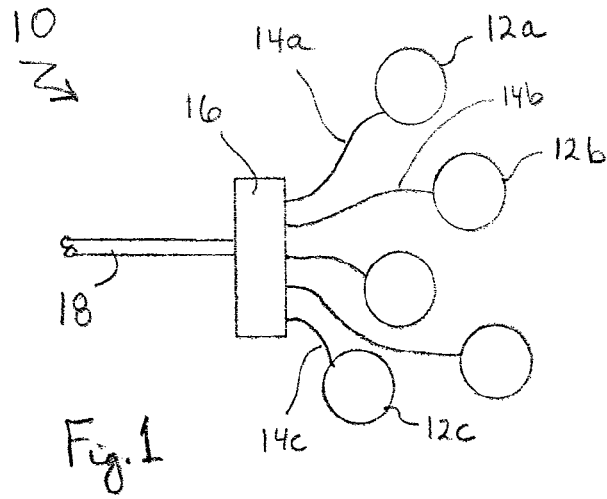
FIG. 1 is an exemplary fiber-optic network for operation of the system of the present invention.

Referring initially to FIG. 1 a fiber-optic network is shown and is generally designated 10. A network 10, such as shown in FIG. 1, is an example of a typical environment for the employment of a plurality of systems 12 of the present invention. As indicated, however, the systems 12a, 12b and 12c are only exemplary, and will normally not be all the same. Indeed, they will frequently differ from each other in their basic functional purposes. In particular, the present invention envisions the transmission of either analog (e.g. voice) or digital (e.g. data) signals over the network 10. Nevertheless, the systems 12a-c are all similar to each other in that the characteristics of their respective transmission capabilities are the same.

In its implementation, the network 10 will typically connect each system 12a-c with a router 16, via a respective fiber-optic line 14a-c. Thus, a signal from one of the systems 12 (e.g. system 12a) can be sent by the router 16 to another system 12 (e.g. system 12b) in a same local network 10. Also, a signal from one of the systems 12 can be sent via the router 16 over a fiber-optic cable 18 to another separate network 10 (not shown).

Figure 2:
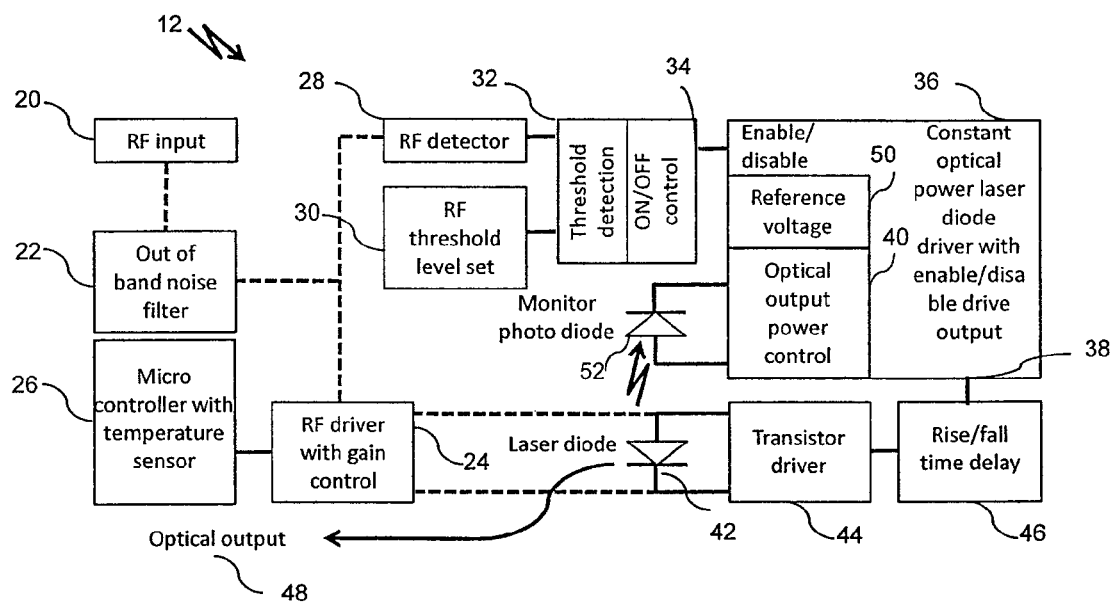
FIG. 2 is a schematic block diagram of the components for the present invention.

Referring now to FIG. 2, a system 12 envisioned for the present invention is intended to receive an RF input 20. As mentioned above, this RF input 20 may be either analog or digital. In either case, a filter 22 is provided to remove and minimize any out of band noise that may be imposed on the signal of the RF input 20. The filtered RF input 20 is then connected to an RF driver 24. A micro controller 26, having a temperature sensor (not shown), can be incorporated to ensure that an appropriately accurate gain control is provided to the RF driver 24 for driving the laser diode 42.

The filtered RF input 20 is monitored by an RF detector 28. At the RF detector 28, a threshold level 30 is set for a threshold detection unit 32 that connects to an ON/OFF control 34. As intended for the present invention, when the signal power in an RF input 20 is detected by the detection unit 32, and when this detected signal power exceeds the set threshold level 30, the output level from control 34 is put into its ON position. This enables the constant optical power laser diode driver 36 to produce an output 38. In turn, this driver output 38 is controlled by an optical output power control 40 in a manner to be disclosed below. When the signal power in an RF input 20 is lower than the set RF threshold level 30, the output level from control 34 is put into OFF position. This disables the constant output power laser diode driver 38, and the laser diode 42 is turned OFF.

FIG. 2 also shows that a laser diode 42 is driven by a transistor driver 44. Further, a rise/fall time delay 46 interconnects the driver output 38 of the constant optical power laser diode driver 36 with the transistor driver 44 for the laser diode 42. An important aspect of the system 12 is that the optical output power control 40 maintains the optical output power 48 for the laser diode 42 substantially constant. Another important aspect of the system 12 is that the time delay 46 provides for a reliable and stable turn-on/turn-off of the laser diode 42.

To control the optical output power 48 for the laser diode 42, a reference voltage 50 is established. Additionally, a photo diode 52 is positioned to monitor the actual optical output power 48 of the laser diode 42. The optical output power control 40 then compares the reference voltage 50 with the actual optical output power 48 to create an error signal. This error signal is then used to maintain the driver output 38 of the optical power driver 36 at a substantially constant level. Consequently, the substantially constant driver output 38 will maintain a substantially constant optical output power 48 for the laser beam that is generated by the laser diode 42 for carrying the optical signals.

Figure 3:
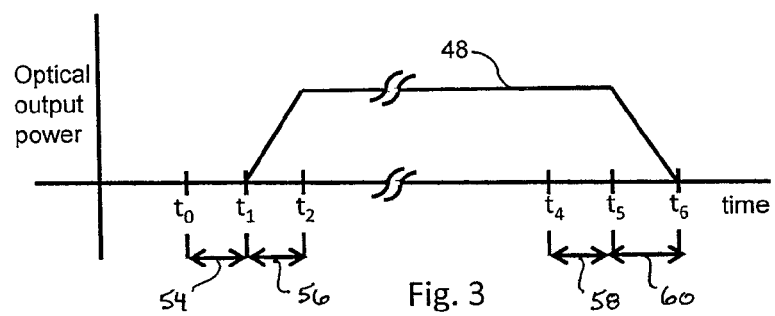
FIG. 3 is a time graph for an initiation of an optical signal transmission in accordance with the present invention.

The operational features of the time delay 46 will be best appreciated with reference to FIG. 3. There it will be seen that during a "quiet time" (i.e. time prior to "$t_0$") the optical output power 48 is zero. For purposes of disclosure, however, consider that at the time "$t_0$", an RF input 20 is received by the threshold detection unit 32. If the signal power in this RF input 20 is above the RF threshold level 30, the ON/OFF control 34 will go ON, and the time delay 46 will be activated. At time "$t_1$", after a dwell time 54 from "$t_0$" to "$t_1$" has expired, the optical output 48 will begin to rise during a rise time 56 between "$t_1$" and "$t_2$". At time "$t_2$", the laser diode 42 is fully operational and ready to transmit the RF input 20 as optical signals over the network 10. As envisioned for the present invention, the total turn-on time from "$t_0$" to "$t_2$" will be set in a range between 0.5 and 1.5 microseconds. At time "$t_4$", the RF input 20 is turned OFF. The output of RF detector 28 is lower than the set threshold level 30; the ON/OFF control 34 will go OFF and disable the transistor driver 44 for laser diode 42. At time "$t_5$", after a dwell time 58 between "$t_4$" and "$t_5$" has expired, the optical output 48 will begin to fall during the fall time 60 between "$t_5$" and "$t_6$". After the time "$t_6$", the laser diode 42 is turned OFF.

While the particular System and Method for Transmissions Via RF Over Glass as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for controlling optical signals which comprises:

an integrated circuit including an RF detector;

a threshold detection circuit with a threshold level set for determining when the power of an incoming RF signal exceeds a predetermined threshold;

an ON/OFF control responsive to the detector, wherein the ON/OFF control turns ON to initiate a transmission when power in the RF signal exceeds the predetermined threshold;

a time delay connected to the ON/OFF control for delaying transmission of the RF signal for an established turn-on time;

an optical power driver positioned on the integrated circuit electronically connecting the ON/OFF control with the time delay to actuate the time delay and start the turn-on time; and a laser diode, external to the integrated circuit, responsive to the time delay for creating a laser beam to carry the RF signal.

2. A system as recited in claim 1 further comprising:

a source for providing a reference voltage, wherein the source is incorporated into the integrated circuit;

a photo diode for monitoring the optical output power in the laser beam;

a power control circuit for comparing the optical output power in the laser beam with the reference voltage to generate an error signal; and an electrical connection between the power control circuit and the optical power driver for adjusting an output from the optical power driver to minimize the error signal and maintain the optical output power in the laser beam carrier substantially constant.

3. A system as recited in claim 1 further comprising a noise filter for removing out of band noise from the RF signal.

4. A system as recited in claim 1 wherein the time interval for the turn-on time is in a range of approximately 0.5 to 1.5 microseconds.

5. A system as recited in claim 1 wherein transmissions of the RF signal from the laser diode are made as a sequence of burst mode transmissions in accordance with a standard protocol, and wherein the turn-on time for each transmission is the same.

6. A system as recited in claim 1 wherein the laser diode is completely turned OFF when there is no RF signal.

7. A method for manufacturing a system for controlling optical signals which comprises the steps of:

providing an ON/OFF control responsive to an RF signal, wherein the control turns ON when power in the RF signal exceeds a predetermined threshold, and turns OFF when the power falls below the predetermined threshold;

connecting an optical power driver to the ON/OFF control;

orienting a laser diode, wherein the laser diode is responsive to the optical power driver to transmit optical signals on a laser beam carrier, wherein the optical signals carry the RF signal over a fiber-optic network;

interconnecting a time delay between the optical power driver and the laser diode to establish a turn-on time for the laser diode, wherein the turn-on time is set as a fixed time interval after the ON/OFF control turns ON;

positioning a photo diode to monitor the optical output power in the laser beam created by the laser diode;

engaging a power control circuit with the photo diode to compare the optical output power in the laser beam carrier with a reference voltage to generate an error signal; and electrically connecting the power control circuit with the optical power driver to adjust an output from the optical power driver to minimize the error signal and maintain the optical output power in the laser beam substantially constant.

8. A method as recited in claim 7 further comprising the steps of:

installing an RF power detector for detecting the RF signal; and integrating a threshold level circuit with the RF power detector to set a level for the predetermined threshold.

9. A method as recited in claim 8 further comprising the steps of:

setting the turn-on time in a range of approximately 0.5 to 1.5 microseconds; and completely turning OFF the laser diode when there is no RF signal.

* * * * *